(12) United States Patent
Bloemer et al.

(10) Patent No.: US 7,412,144 B2
(45) Date of Patent: Aug. 12, 2008

(54) PHOTONIC CRYSTAL-BASED OPTICAL WAVEGUIDE MODULATOR

(75) Inventors: Mark J. Bloemer, Athens, AL (US); Michael Scalora, Huntsville, AL (US); Evgenl Y. Poliakov, San Pedro, CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/188,062

(22) Filed: Jul. 22, 2005

(65) Prior Publication Data

US 2007/0019919 A1   Jan. 25, 2007

(51) Int. Cl.
*G02B 6/10* (2006.01)
(52) U.S. Cl. .............. 385/129; 385/8; 385/4; 385/2; 385/131
(58) Field of Classification Search ........... 385/1–10, 385/37, 39, 40, 129–131
See application file for complete search history.

(56) References Cited

U.S. PATENT DOCUMENTS

| | | | | |
|---|---|---|---|---|
| 4,880,752 | A * | 11/1989 | Keck et al. ............... | 435/7.72 |
| 6,061,381 | A * | 5/2000 | Adams et al. .............. | 372/96 |
| 2006/0088265 | A1* | 4/2006 | Akiyama et al. .......... | 385/129 |
| 2007/0013991 | A1* | 1/2007 | Kise et al. ................ | 359/245 |

OTHER PUBLICATIONS

A. Yariv and P. Yeh, "Optical Waves in Crystals: Propagation and Control of Laser Radiation", Wiley, New York, (1984), pp. 477-481.
J.C. Knight, J. Broeng, T.A. Birks, and P. St. Russell, "Science", 282, 1476 (1998).
R.F. Cregan et al. "Science", 285, 1537 (1999).
S.O. Konorov et al., JETP Lett., 76, 341 (2002).
C.M. Smith et al., "Nature", 424, 657 (2003).
S.O. Konorov, A.B. Dedotov, and A.M. Zheltikov, Opt. Lett. 28, 1448 (2003).
P.Yeh and A. Yariv, Opt. Commun., 19, 427 (1976).
A.Y. Cho, A. Yariv and P. Yeh, Appl. Phys. Lett., 30, 471 (1977).
P. St. Russell, "Science", 299, 358 (2003).
M. Scarola, J.P. Dowling , C.M. Bowden, M. Bloemer, J. Appl. Phys. 76, 2023 (1994).

(Continued)

*Primary Examiner*—Kevin S Wood
(74) *Attorney, Agent, or Firm*—Michael K. Gray (57) ABSTRACT

A waveguide has upper and lower cladding regions. A core of the waveguide made of a non-linear optical polymer is positioned between the upper and lower cladding regions. A first electrode is connected to the upper cladding region and a second electrode is connected to the lower cladding region. The upper cladding region and the lower cladding region are made of photonic band gap materials and have multiple periods of cladding layers with each period having a first layer having a linear refractive index of $n_1$ and each period having a second layer having a linear refractive index of $n_2$. The waveguide allows for minimal distances to exist between the electrodes while allowing for virtual lossless cm-long transmission of propagating light. By applying a voltage to the electrodes, the propagated light can be modulated.

20 Claims, 5 Drawing Sheets

OTHER PUBLICATIONS

P. Yeh, A. Yariv and E. Marom, J. Opt. Soc. Am., 68, 1196, (1978).
Yong Xu, R.K. Lee and A. Yariv, Opt. Lett., 25, 1756 (2000).
M. Ibanescu et al., "Science", 289, 415, (2000).
C.M. Bowden, J.P. Dowling and H.O. Everitt, Eds. Special Issue fo Josa B, 10, 279 (1993).
C.W. Bowden and A.M. Zheltikov, Eds., Special Issue of Josa B, 19, #9, (2002).
C.M. de Sterke and J.E. Sipe, Prog. Opt. 33, 203 (1994).
M.D. Tocci et al., Appl. Phys. Lett., 66, 2324.
T.A. Tumolillo and P.R. Ashley, Appl. Phys. Lett., 62, 3068 (1993).
J.S. Cites and P.R. Ashley, Appl. Phys. Lett. 68, 4452 (1996).
M. Scalora, J.P. Dowling; C.M. Bowden; and M.J. Bloemer, Phys. Rev. Lett., 73, 1368 (1994).
T.E. Van Eck, A.J. Ticknor, R.S. Lytel, and G.F. Limpscomb, Appl. Phys. Lett., 58, 1558.
P.R. Ashley, Proc. SPIE, 2290, 114, (1994).
K.W. Jelley, G.T. Valliath and J.W. Stafford, IEEE Photon. Tech. Lett., 4, 1157 (1992).
P. De Dobbelaere et al., Proc. SPIE, 2285, 352 (1994).
P. Van Daele et al., 15th Euro Conf. Opt. Comm. (ECOC '89), PDB-4 (1989).
G. Ouyang, Yong Xu and A Yariv, Opt. Express, 9, 733 (2001).
T. Kawanishi and M. Izutsu, Opt. Express, 7, 10 (2000).
S.G. Johnson et al., Opt. Express, 9, 748 (2001).
W.N. MacPherson et al., Opt. Commun., 193, 97 (2001).
J. Reichet et al., Phys. Rev. Lett., 84, 3232 (2000).
E.A. Szillas and A.E. Siegman, Appl. Opt., 14, 1874 (1975).
M.D. Feit and J.A. Fleck, Jr., Appl. Opt. 19, 2240 (1980).
M. Scarola et al., Phys. Rev. A, 56, 3166 (1977).
M. Bloemer et al., Appl. Phys. Lett., 72, 1676 (1998).

* cited by examiner

PHOTONIC CRYSTAL-BASED OPTICAL WAVEGUIDE MODULATOR

DEDICATORY CLAUSE

The invention described herein may be manufactured, used and licensed by or for the U.S. Government for governmental purposes without payment of any royalties thereon.

BACKGROUND OF THE INVENTION

1. Field of the Invention

This invention pertains to the field of photonic bandgap technology. More particularly, the invention pertains to a waveguide that permits the virtually lossless unidirectional propagation and phase shift of light.

2. Discussion of the Background

Over the past couple of decades, active and passive devices ranging from optical switches to complex integrated networks have been developed in the data communication and optics industries Recently, the data communications and optics industries have experienced high demand for various types of small-scale opto-electronic devices. The importance of optical waveguides for both single and multi-mode transmission is unquestionable—particularly in the 1.3-1.6 μm region of commercial S-, C- and L-bands.

Along with index-step guiding, or guiding through total internal reflection, certain classes of waveguides can guide light by Bragg reflection, or by photonic band gaps (PBGs).

Waveguides can be utilized as phase modulators by applying an electric field to the waveguide. Phase modulation occurs by means of an electro-optic effect as the electric field reacts to the waveguide. Metal electrodes or plates are placed on opposite sides of the waveguide and with the application of an electrical field, phase modulation occurs in the propagating light beam. As a rule of thumb, the larger the applied electric field, the shorter one can design the waveguide.

Figure 1:
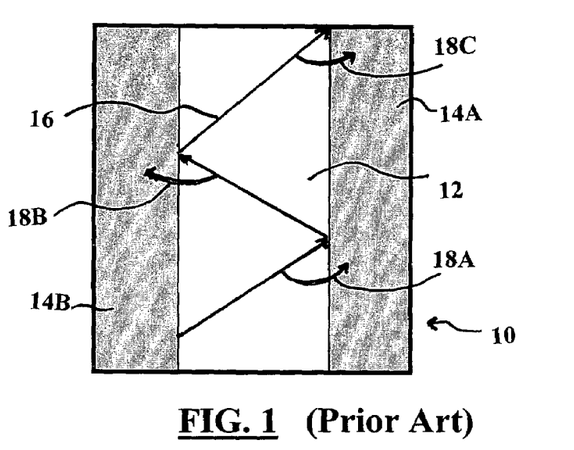
FIG. 1 is a prior art conceptual illustration of the absorption loss of a light beam as it propagates through a waveguide.

However, in prior art devices, as the distance between the metal plates decreases, absorption or loss of the light energy substantially increases. This absorption problem of the prior art is illustrated in FIG. 1. As light 16 is propagated and reflected in guide region 12 of waveguide 10, losses 18A, 18B, 18C are absorbed in the cladding 14A, 14B.

In that spatial economy is a desired feature in electro-optic systems, a need is seen for a device that allows for a small separation of distance between the metal electrodes while minimizing optical loss in the waveguide.

SUMMARY OF THE INVENTION

Accordingly, one object of the present invention is to provide a waveguide that improves spatial economy while significantly diminishing optical loss in the waveguide.

Another object is to provide a waveguide modulator device that can be tuned and retuned to a desired frequency.

A further object is to provide a waveguide modulator device that allows for the easy detection of phase modulated light.

These and other objects are realized by a waveguide having a core made of a non-linear optical polymer or similar material having a linear refractive index of $n_0$. In a transverse (radially outward direction) from both the top and bottom of the core, a plurality of cladding layers are repeated in periodic patterns with a first layer of each respective periodic pattern having a refractive index of $n_1$, and a second layer of each respective periodic pattern having a refractive index of $n_2$. The second layer of each respective periodic pattern is further from the core than the first layer of each respective periodic pattern.

In the present invention, the optical waveguide modulator is provided with a cladding structure having at least four periods or more, which results in losses smaller than a fraction of a percent for waveguides measuring a few centimeters in length.

The present invention operates on the basis of linear electromagnetic interference. Its optical guidance is solely due to the presence of photonic band gaps. The core's nonlinear polymer has the sole function of changing the phase of the electromagnetic field—the core does not affect the mode or quality of the waveforms. In addition, the modulator remains single-mode so that coupling losses to an output detector are minimal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 2:
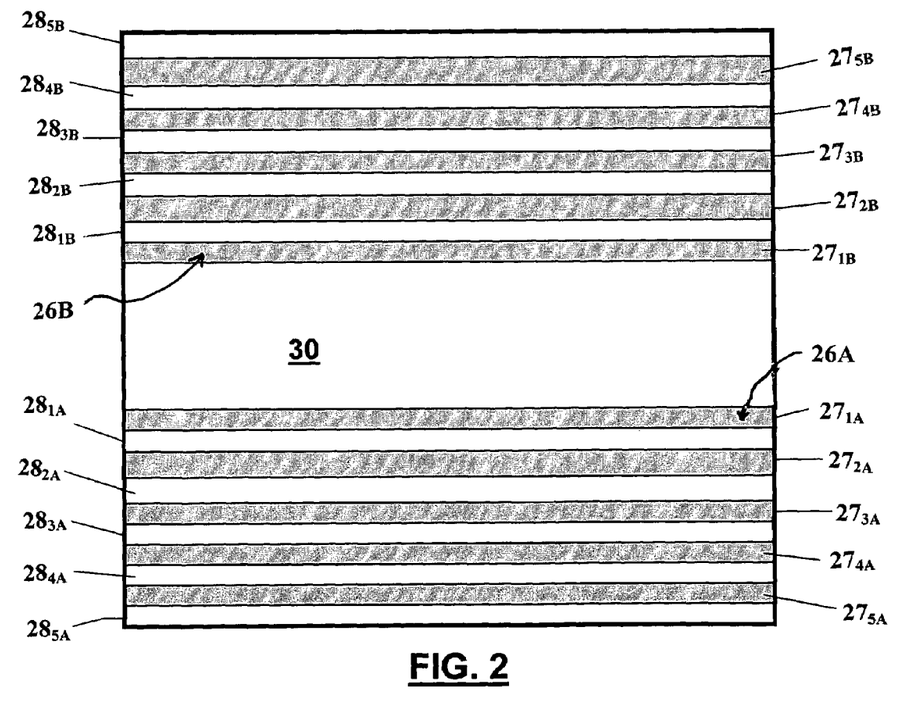
FIG. 2 is a schematic illustration of the periodic layers of cladding that surround the non-linear optical polymer (NLOP) core according to the present invention.

Referring now to the drawings, wherein like reference numerals designate identical or corresponding parts throughout the several views, and, more particularly to FIG. 2, a core 30 formed from a non-linear optical polymer (NLOP) is centrally positioned between a lower cladding region 26A and an upper cladding region 26B. The core has a linear refractive index of $n_0$.

The upper cladding region has a plurality of layers $27_{1B}$, $28_{1B}$, $27_{2B}$, $28_{2B}$, $27_{3B}$, $28_{3B}$, $27_{4B}$, $28_{4B}$, $27_{5B}$, and $28_{5B}$ that are positioned one on top of the other. Correspondingly, the bottom cladding region has stacked layers $27_{1A}$, $28_{1A}$, $27_{2A}$, $28_{2A}$, $27_{3A}$, $28_{3A}$, $27_{4A}$, $28_{4A}$, $27_{5A}$, and $28_{5A}$. Layers $27_{1B}$, $27_{1A}$, $27_{2B}$, $27_{2A}$, $27_{3B}$, $27_{3A}$, $27_{4B}$, $27_{4A}$, $27_{5B}$, and $27_{5A}$ have a linear refractive index of $n_1$ and layers $28_{1B}$, $28_{1A}$, $28_{2B}$, $28_{2A}$, $28_{3B}$, $28_{3A}$, $28_{4B}$, $28_{4A}$, $28_{5B}$, and $28_{5A}$ have a linear refractive index of $n_2$.

Thus, the stacked cladding layers are positioned such that the first layers next to the core 30 have an index of $n_1$ with the second layers from the core having an index of $n_2$. This periodic pattern of alternating the linear refractive index (from $n_1$ to $n_2$) for successive layers of cladding is repeated for a desired number of periods.

Figure 3:
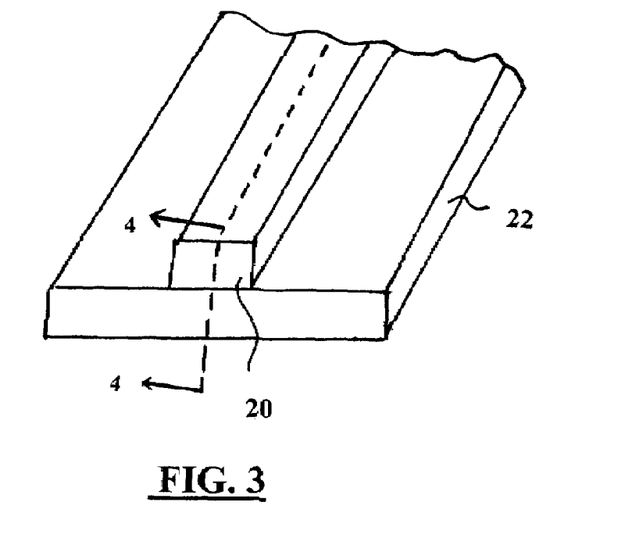
FIG. 3 is a perspective illustration of a waveguide according to the present invention.
Figure 4:
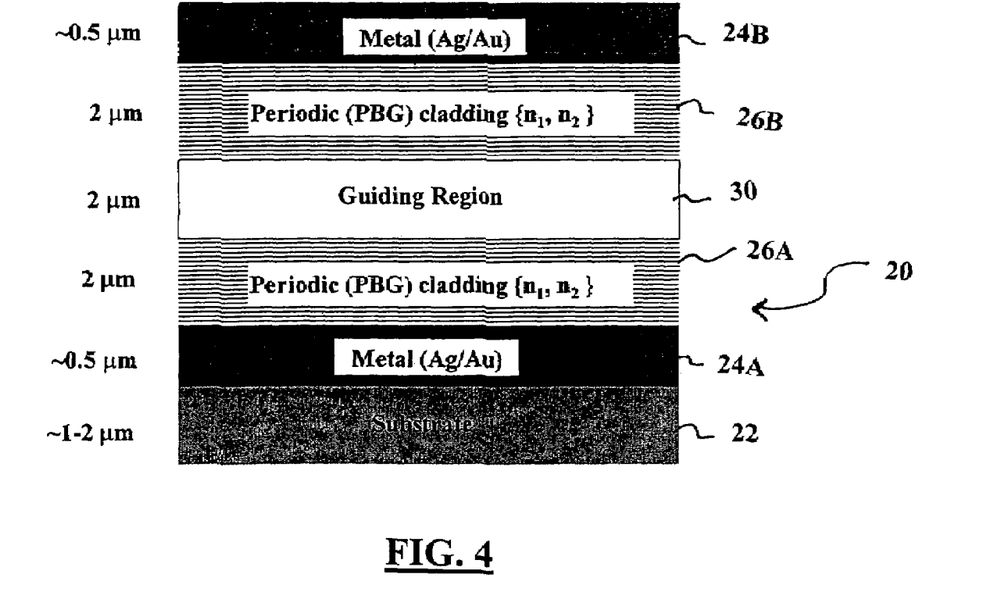
FIG. 4 is a cross sectional illustration of the waveguide of the present invention taken along line 4-4 of FIG. 3.

In FIG. 3, the waveguide 20 of the present invention is depicted on substrate 22. In FIG. 4, a cross-sectional view of the waveguide 20 demonstrates that the guide region or core 30 is positioned between the upper and lower cladding regions 26B, 26A. Both of the cladding regions have a plurality of cladding layers. Transverse to (i.e., radially outward) from the cladding regions are positioned respective metal layers 24B and 24A that serve as electrodes for the waveguide. Metal layer 24A is positioned on the top of substrate 22. Metal layers 24B and 24A are preferably made of gold, silver or other highly conductive material.

Figure 5:
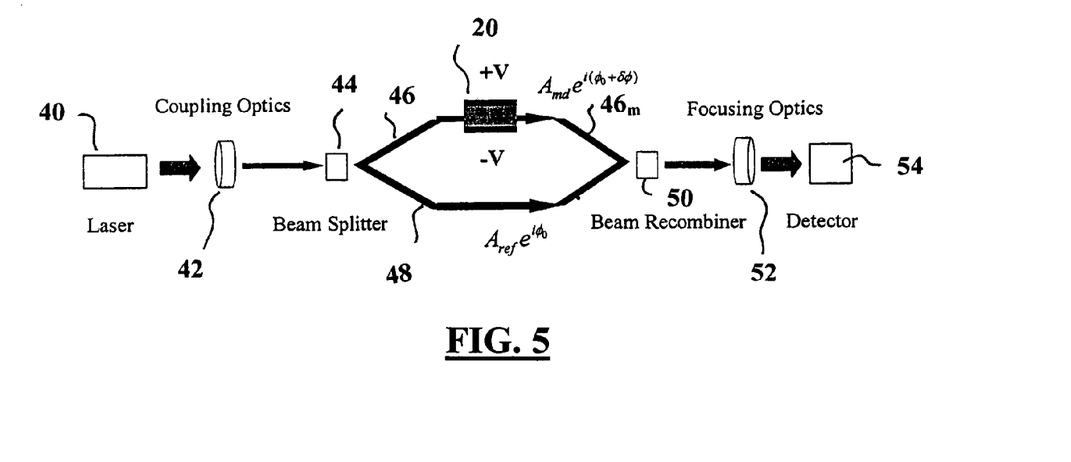
FIG. 5 is a schematic illustration of a Mach-Zehnder interferometer system that utilizes the waveguide 20 of the present invention.

In FIG. 5, a phase shift detection system includes a laser 40 for generating a laser beam that passes through coupling optics 42. A beam splitter 44 splits the laser beam into a first beam 46 and a second beam 48. The first beam 46 travels into a first arm of an interferometer and the second beam 48 travels into a second or reference arm.

The first arm is provided with waveguide 20 that phase modulates light beam 46 such that a modulated beam $46_m$ and the second beam 48 are combined in beam recombiner 50. After passing through focusing optics 52, the combined beam is detected by detector 54 that detects the degree of phase modulation.

The linear phase $\phi_0 = (2\pi/\lambda)n_0$ ($n_0$ is the linear index of NLOP material) is the same in the both arms of the interferometer. However, due to a nonlinear correction to the refractive index $\delta n_0$ within the modulator arm, a phase delay $\delta\phi$ between the two components is introduced. $\delta\phi$ is proportional to the external electric field (voltage): $\delta\phi = (2\pi/\lambda)\delta n_0 \sim E_{ext}$.

The metal layers 24A, 24B are used to achieve the necessary electrical contact to make the NLOP function. Once the voltage is applied between the metal plates, the piezoelectric shift changes the phase of a guided optical field.

As seen in FIG. 5, the two components of the original light wave are recombined. The output intensity registered by a photodiode. i.e. the detector 54 equals to $|A_{ref}e^{i\Phi_0} + A_{md}e^{i(\Phi_0+\delta\Phi)}|^2$, where $A_{ref}$ and $A_{md}$ are the real field amplitudes in the reference and modulated arm.

If $\delta\phi \neq 0$, the output intensity becomes a function of the external electric field, $E_{ext}$, resulting in an intensity variation $\delta I = 2A_{ref}A_{md}\cos(\delta\phi)$. Thus, fringes of constructive (and destructive) interference are observed by the detector 54. These interferences are subject to the slightest variations of non-linear phase $\delta\phi$, thus making such an interferometer an excellent tool for temperature, pressure, metrology, and other applications.

The waveguide 20 acts as a Mach-Zehnder photonic crystal modulator (MZPCM). As previously stated, the core 30 consists of a nonlinear optical polymer (NLOP) having a refractive index $n_0$. Upon a voltage being applied to the upper and lower plates, the NLOP provides the necessary piezoelectric phase shift between the split wave components.

GaAs and $Al_2O_3$ are given as particular examples of the step-index profile {$n_1$ and $n_2$, respectively} of the cladding layers. The metal parameters for Ag at $\lambda=1.33$ μm are: n=0.396+8.13i. The substrate is assumed to have index equal to $n_0$.

Upon exposure to an electric field, in addition to the linear refractive index $n_0$, the nonlinear polymer material undergoes a nonlinear index correction $\delta n_0$, where $\delta n_0 \ll n_0$. Since $\delta n_0$ is caused by an external (voltage driven) field, the NLOP material does not affect light propagation within the central waveguide (the core).

Figure 6:
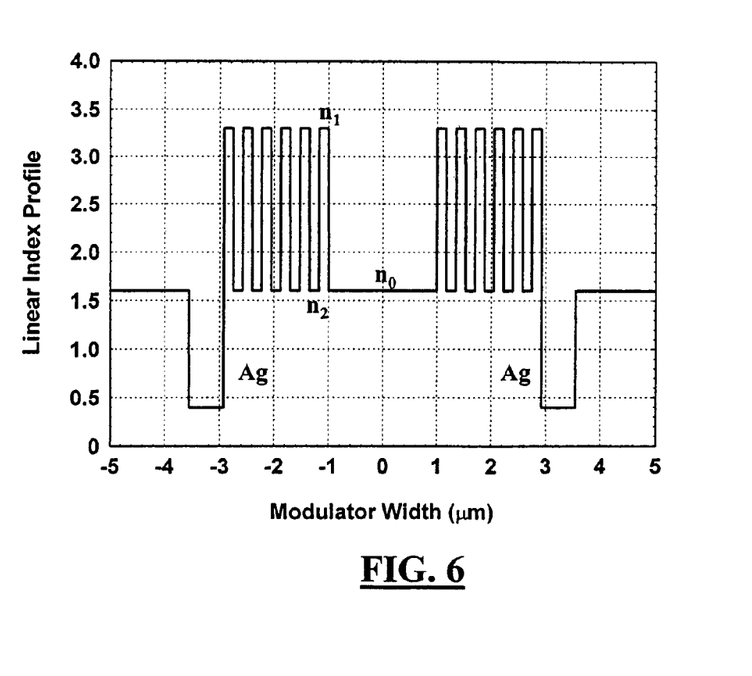
FIG. 6 is a transverse refractive index profile of the waveguide according to the present invention as utilized in the phase shift arm of the interferometer of FIG. 5.

A step-graded index is shown in FIG. 6 ($n_1$ and $n_2$ being the low and high refractive indices, respectively). This profile effectively demonstrates the band-gap structure. The role that these multi layers play is critical: The light becomes confined within the core through a photonic band gap, with several repeated layers refining the effect.

The operating wavelength(s) or output of the modulator device is selected from the middle of the passband. As known from the physics of band gap materials, layer thickness determines both the location and width of stop-bands and band gaps.

The modulator of the present invention, encompasses three refractive indexes: one for the core ($n_0$) and two additional indexes for the layers of the transverse index profile $n(x)=\{n_1; n_2\}$.

However, in practicality, the waveguide of the present invention has (apart from the surrounding metal) two distinctive refractive index coefficients: $n_0$ is for a central part (where a nonlinear polymer is placed), and $n_1$; $n_2=n_0$ for the adjacent PBG layers ($n_2$ need only be approximately equal to $n_0$). Having two refractive indexes is preferable in terms of transmittance over loss, in terms of desirable output frequency, and in terms of structural simplicity.

As outlined in the caption of FIG. 6, a PBG material with parameters consistent with $Al_2O_3$ (n~1.6) and Si (n~3.3) is to be selected. The low transmittance loss is clearly demonstrated in FIG. 8, where for N=6 periods it is ~0.55% at z=1 cm, and ~0.65% at z=2 cm.

Figure 8:
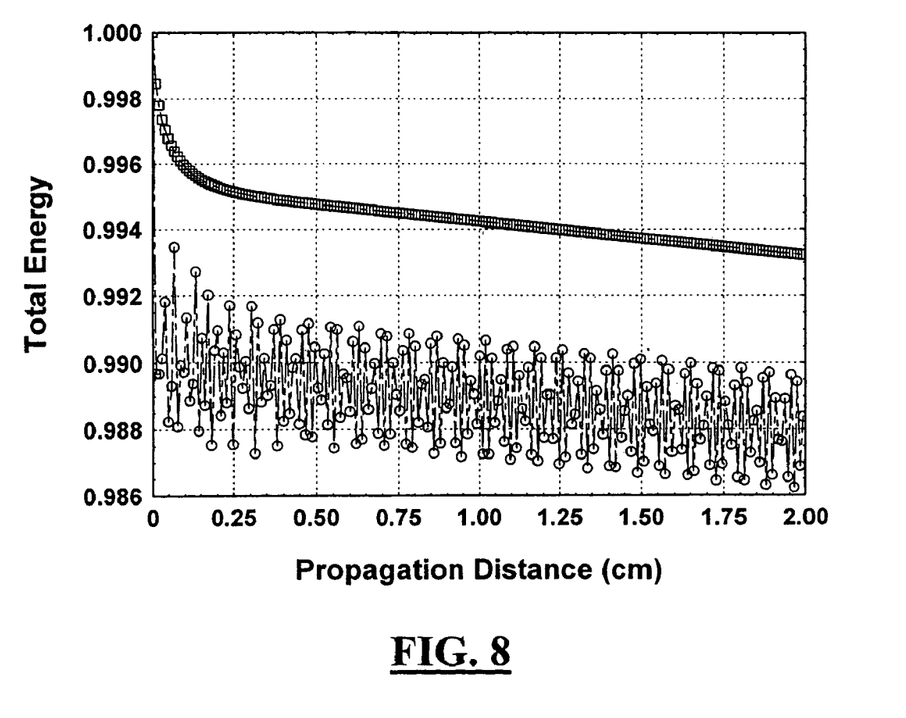
FIG. 8 is a graphical illustration of the total light energy as a function of propagation distance for the waveguide according to the present invention with the square indicating total energy for the entire waveguide including the cladding and circles indicating energy within the guiding layer.

Most of the energy loss at small propagation distances can be attributed to the initial mismatch between the input field and the guided mode that evolves from it. Once the field profile stabilizes, losses become linear and approach the limit of ~0.1%/cm, roughly 0.004 dB/cm. For applications to integrated circuit environments, this is virtually lossless transmission.

The waveguide modulator of the present invention was tested when the distance between metal plates was approximately 6 microns, which included both the NLOP (central waveguide-2 μm) and the surrounding PBG structure (4 μm). This small transverse (radial) dimension allowed for smaller external voltages.

Figure 7:
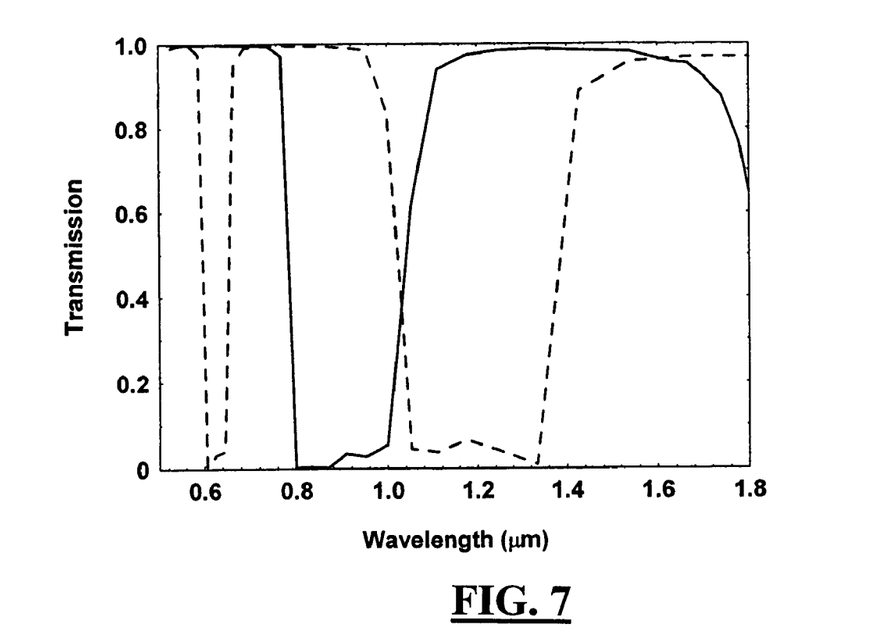
FIG. 7 is a graphical illustration depicting the transmission versus wavelength for the PBG structures with graded index profiles depicted in FIG. 6 for two different layer thicknesses.

In FIG. 7 transmission as a function of the wavelength for two different layer thicknesses is graphically illustrated. The change in layer thickness results in a shifting of photonic band gap structure. For the dashed curve (FIG. 7), layer thickness is chosen to be 0.225 μm for each layer of cladding, while for the solid curve layer thickness is 0.175 μm. The figure suggests a red-shift of the band structure occurs with decreasing layer thickness. Another important feature is the selectivity of allowed wavelengths (sub-bands).

For telecom applications, for example, one would like to have the output wavelength of 1.33 μm. To achieve this, a layer thickness of 0.175 μm, puts the wavelength of interest, 1.33 μm, in the middle of the pass-band.

In FIG. 7, the allowed wavelength bands, which correspond to well-confined modes, are quite wide, with output transmission being near unity. However, with an appropriate change of layer thickness, practically any desired wavelength can be centered at a maximum of transmission.

FIG. 7 demonstrates a profile of "allowed" wavelengths for the propagated light waves in a waveguide having six periods of periodic cladding as demonstrated in FIG. 6 of the aforementioned thicknesses.

For these wavelengths, the light is confined within the core 30 of the waveguide and does not escape into the cladding and the transmittance is near unity. In such a case, the spectra of allowed wavelengths are wide.

Part of the reason for this is due to the large difference between the high and the low refractive indices, which are $n_1 \sim 3.3$ and $n_2 \sim 1.6$, respectively, resulting in $\Delta n \sim n_2$, as depicted in FIG. 6. The trend that usually emerges is that the larger $\Delta n = |n_2 - n_1|$ is, the larger the energy gap will be, a fact that makes it easier, from a technological point of view, to control the ratio of maximum and minimum transmittance.

Having such a large barrier $\Delta n$ means that materials different than the silica-on-silicon materials typically found in semiconductor devices (where $\Delta n \approx 0.1$) must be employed. Ideally, large $\Delta n$ would require fewer periods along the transverse coordinate.

FIG. 8 demonstrates total energy versus propagation distance for a cosine-shaped input wave packet, tuned at 1.33 µm. The multiple squares indicate the total energy for the entire waveguide, including cladding—the multiple circles indicate the energy within the guiding layer. As indicated, the rate of overall energy loss is quite small, and most of it may be attributed to the fact that the input beam profile is not precisely matched with the waveguide mode. In fact, the field is so well-confined by the PBG cladding that for all practical purposes the presence of the metal has no influence on the propagation for the first few centimeters of fiber. The overall loss for the first cm of fiber (i.e., first cm of the core) is ~0.5%. The loss rate reduces to 0.3%/cm for the next cm of fiber, a clear indication that these initial losses are not related to the presence of the metal. The energy within the core oscillates as the field penetrates and then returns from the surrounding multilayer stacks.

Figure 9:
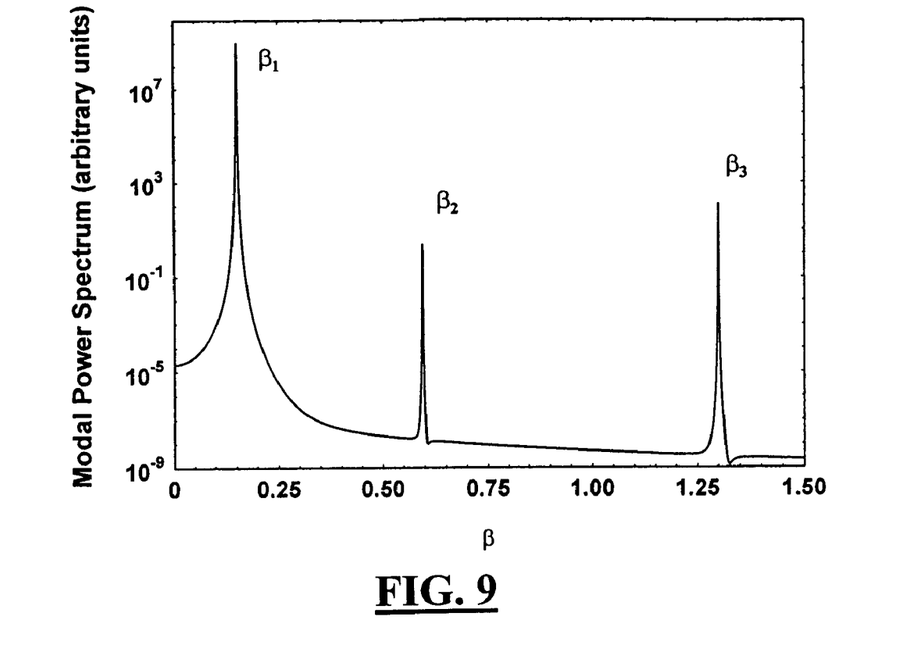
FIG. 9 is a modal power spectrum for corresponding to the waveguide data of FIG. 8.

The modal power spectrum, as a function of the longitudinal wave vector, is shown in FIG. 9, although several modes are excited the first three are shown. From the input field, the fundamental mode dominates all other modes by at least seven orders of magnitudes; thus, for all intents and purposes the waveguide of the present invention operates in a single mode.

Figure 10:
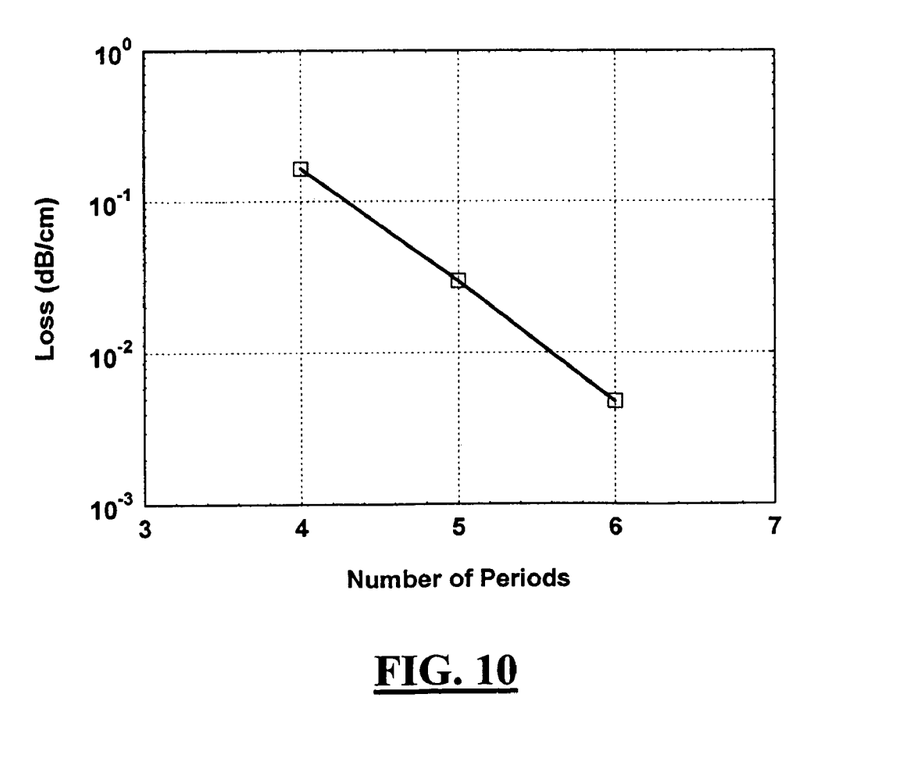
FIG. 10 is a graphical illustration depicting loss as a function of the number of layers for each of the multilevel stacks of cladding that surround the core.

FIG. 10, demonstrates that as the number of cladding layers decrease, the ability to propagate the light efficiently due to band-gap effect decreases. If the electric field is not as well confined, the surrounding metal causes leaky modes to evolve, and the energy begins to erode from the core much more quickly.

The waveguide of the present invention has exhibited stability with respect to random Gaussian fluctuations of individual layer thicknesses. Simulations were performed that assumed that the thickness of each layer could vary with a standard deviation $\sigma = \pm 15\%$, resulting in variation from 0.131 to 0.215 µm.

The results obtained suggest that the overall band structure changes slightly, resulting in a reduction in maximum transmittance by a fraction of one percent. The passbands are relatively wide, and thus remain stable to relatively small thickness fluctuations.

In the waveguide modulator of the present invention, specifically arranged graded index profiles (within PBG layers) allow one to achieve low losses (~0.004 dB/cm), and still have single-mode operation. As can be appreciated from FIG. 8, at least 7 orders of magnitude separate the peak of the fundamental mode from the next excited guided mode; thus, for all practical purposes the propagation is single mode.

A relatively small number of PBG layers ($N \geq 5$, see FIG. 10) is enough to confine the light extremely well, although even fewer layers may yield acceptable levels of loss for particular purposes. Thus, although losses increase as the number of periods decrease, a specific application will dictate the choice of parameters and optimization procedures.

FIG. 10 shows the general trend as the number of layers is decreased. In simulations undertaken, Si and $Al_2O_3$ were used to tune the output wavelength to 1.33 µm, with virtually loss-less transmission. Experimentation has inextricably demonstrated that it is advantageous (in terms of maximized transmittance and for design purposes) to match one of the refractive indices in graded index profile to that of the central waveguide.

In that the thickness of the device is smaller then an ordinary silica-on-silicon polymer-based optical modulator, the electric field needed to modulate the device output can be decreased by a factor of 2 or more when compared to the typical prior art device. With diligent optimization, further reductions in layer thickness, reducing metal plate separation even further, are possible.

The PBG structure of the present invention is relatively insensitive to thickness fluctuations of each layer, which can sustain at least a ±15% variation and still exhibit lossless transmission (over cm-long distances) transmission. (It is noted that current beam epitaxy methods can control sub-micron thickness down to 5% or better.)

The waveguide modulator of the present invention is substantially lossless over cm-long distances (for the structures investigated a loss of approximately 0.1%/cm, or 0.0043 dB/cm where transmission loss is defined as dB in the standard manner: $dB = 10 \log_{10}(T/T_0)$.

As previously noted, the device has smaller radial (transverse) dimensions by at least a factor of two compared to conventional modulators; can be manufactured with only two materials (apart from the necessary metal and substrate); and it has relatively few layers for graded index profile. Its operation is quite consistent and robust even with variations of the layer thickness.

The modulator can be easily re-tuned from the conventional 1.3-1.6 µm region to practically any wavelength (IR, visible, or micron-range by changing the periodicity of the structure, not the materials themselves or the fabrication process).

The waveguide modulator of the present invention can be utilized in innumerable devices that utilize the phase modulation of light for a measuring or comparing function.

Various modifications are possible without deviating from the spirit of the present invention. Accordingly the scope of the invention is limited only by the claim language which follows hereafter.

What is claimed is:

1. A waveguide modulator comprising:
   a waveguide having a core having a linear refractive index of $n_0$;
   a plurality of cladding layers repeated in periodic patterns with a first layer of each respective periodic pattern having a linear refractive index of $n_1$, and a second layer of each respective periodic pattern having a linear refractive index of $n_2$, said second layer of each respective periodic pattern being further from the core than said first layer of each respective periodic pattern, said second layer of each respective periodic pattern having a linear refractive index which is substantially equal to the linear refractive index of said core, said plurality of cladding layers comprise an upper cladding region and a lower cladding region, said core being positioned between said upper cladding region and said lower cladding region;

a first electrode connecting to said upper cladding region and a second electrode connecting to said lower cladding region for providing a voltage for purposes of modulating a light wave propagating through said core; and wherein said upper cladding region comprises a first portion of said plurality of cladding layers repeated in periodic patterns with the first layer of each respective periodic pattern having the linear refractive index of $n_1$ and the second layer of each periodic pattern of said first portion of cladding layers having the linear refractive index of $n_2$, said lower cladding region comprises a second portion of said plurality of cladding layers repeated in periodic patterns with the first layer of each respective periodic pattern having the linear refractive index of $n_1$, and the second layer of each periodic pattern of said second portion of cladding layers having the linear refractive index of $n_2$.

2. A waveguide according to claim 1, wherein:
the absolute value of the difference between the linear refractive index of $n_1$ and the linear refractive index of $n_2$ is greater than 1.

3. A waveguide according to claim 1 wherein:
said core is made of a non-linear optical polymer.

4. A waveguide according to claim 1, wherein said upper cladding region and said lower cladding region have at least four periodic patterns.

5. A waveguide according to claim 1, wherein said upper cladding region and said lower cladding region have at least five periodic patterns.

6. A waveguide according to claim 4, wherein said upper cladding region and said lower cladding region are made of materials that serve as photonic band gaps.

7. A waveguide according to claim 6 wherein said core is made of a non-linear optical polymer.

8. A waveguide according to claim 1, wherein:
said first electrode and said second electrode are metal plates.

9. A waveguide modulator, comprising:
an upper cladding region and a lower cladding region;
a core made of a non-linear optical polymer positioned between said upper and lower cladding regions;
a first electrode connected to the upper cladding region;
a second electrode connected to said lower cladding region; and wherein said upper cladding region and said lower cladding region have multiple periods of cladding layers with each period having a first layer having a linear refractive index of $n_2$ and said each period having a second layer having a linear refractive index of $n_2$.

10. A waveguide modulator according to claim 9, wherein: said core has a linear refractive index of $n_0$ that is substantially equal to the linear refractive index $n_2$.

11. A waveguide modulator according to claim 10, wherein: the absolute value of the difference between the linear refractive index of $n_1$ and the linear refractive index of $n_2$ is greater than 1.

12. A wave guide modulator according to claim 11 wherein: said first and second layers of said each period are made of materials that serve as photonic band gaps.

13. A waveguide modulator according to claim 9, wherein the distance between the first electrode and the second electrode is less than seven μm.

14. A waveguide modulator according to claim 9, wherein the first and second electrodes are made of metal.

15. A waveguide modulator according to claim 12, wherein said first and second layers can have a thickness fluctuation of ±15% and still allow said core to propagate a light wave over a cm-long distance with virtually no loss in transmission.

16. A waveguide modulator according to claim 12, wherein at least seven orders of magnitude separate a peak fundamental mode from a next excited mode of guided light propagating through said core.

17. A waveguide modulator, comprising:
a waveguide having a core having a linear refractive index of $n_0$;
a plurality of cladding layers repeated in periodic patterns with a first layer of each respective periodic pattern having a linear refractive index of $n_1$, and a second layer of each respective periodic pattern having a linear refractive index of $n_2$, said second layer of each respective periodic pattern being further from the core than said first layer of each respective periodic pattern, said second layer of each respective periodic pattern having a linear refractive index which is substantially equal to the linear refractive index of said core, said plurality of cladding layers comprise an upper cladding region and a lower cladding region, said core being positioned between said upper cladding region and said lower cladding region;
a first electrode connecting to said upper cladding region and a second electrode connecting to said lower cladding region for providing a voltage for purposes of modulating a light wave propagating through said core; and
wherein said linear refractive index $n_0$ of said core is less than the linear refractive index $n_1$ of said first layer.

18. A waveguide modulator according to claim 17, wherein: the core is made of a made of a non-linear optical polymer.

19. A waveguide modulator according to claim 17, wherein: the absolute value of the difference between the linear refractive index of $n_1$ and the linear refractive index of $n_2$ is greater than 1.

20. A waveguide modulator according to claim 19, wherein: the core is made of a made of a non-linear optical polymer.

* * * * *